Patented Mar. 10, 1942

2,275,752

UNITED STATES PATENT OFFICE 2,275,752

CYCLIC CONDENSATION PRODUCTS AND PROCESS OF MAKING SAME

Moses Wolf Goldberg, Zurich, Switzerland, assignor, by mesne assignments, to Ciba Pharmaceutical Products, Incorporated, Summit, N. J., a corporation of New Jersey No Drawing. Application November 10, 1939, Serial No. 303,914. In Switzerland November 25, 1938

11 Claims. (Cl. 260—586)

It has been made known by Diels and Alder that suitable reaction partners—so-called "philodiene components"—which possess a system of double and triple linkages, may be caused to add themselves to compounds which possess a system of conjugated double bonds. However, compounds of the type

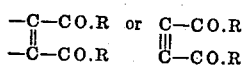

in which R=hydrogen, alkyl, aryl or aralkyl, were not used hitherto to this end.

It has now been found that cyclic condensation products are formed when compounds containing a system of conjugated multiple carbon linkages, as, for example, any compound containing two ethylene linkages or an ethylene and an acetylene linkage, are condensed with 1,2-diacyl-ethylene or 1,2-diacyl-acetylene derivatives.

According to the invention, the following, for example, may be used as reaction partners: 1,2-diacetyl-ethylene, 1,2-diacetyl-propylene or 1,2-diacetyl-butylene; 1-acetyl-2-formylethylene, 1,2-diisobutyryl-ethylene, 1,2-diacetyl-acetylene. But also other derivatives of ethylene or of acetylene which, in the 1,2-position, are substituted by any desired aliphatic, aromatic or aromatic-aliphatic acyl radical, may be employed. In the case of the reaction between 1,2-diacetyl-ethylene and 2,3-dimethyl-buta-1,3-diene, the following is a schematic illustration of the process:

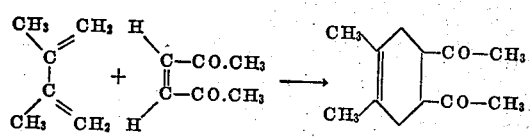

In case, as in the above instance, at least one of the two acyl radicals contains a methylene or methyl group in the α-position, the condensation products obtained may furthermore be caused to undergo cyclization, under the influence of a dehydrating agent, giving rise to the formation of a new cyclopentanone ring. For instance, the 1,2-diacetyl-4,5-dimethylcyclohexene-(4) is easily converted by heating, for example, with a solution of sodium methylate in methyl alcohol, into the 1,5,6-trimethyl-4,9,7,8-tetrahydro-indone-(3) of the following structural formula:

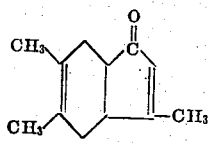

To bring about cyclization, use may naturally be made of other dehydrating agents, in particular those which are generally added in aldolisations (cf. J. Houben, Die Methoden der organischen Chemie, 3rd. edn., vol. 2, pp. 880, 888 and 945). The cyclization may be brought about also, if desired only after reduction of some or of all of the double linkages contained in the condensation product concerned.

Example 1

2.5 parts of 1,2-diacetyl-ethylene and 2.2 parts of 2,3-dimethyl-buta-1,3-diene are boiled in 10 parts of absolute benzene for 6 hours under reflux. The solvent is evaporated and the residue is distilled in a vacuum. The fraction boiling at 135° C. (10 mm.) is taken up in cold pentane, from which it crystallizes. By further re-crystallization from pentane, the 1,2-diacetyl-4,5-dimethyl-cyclohexene-(4), melting point 36–37° C., is obtained in the form of colourless leaves. Its disemicarbazone, prepared in the usual manner and recrystallized from methanol, melts at 214.5° C. with decomposition.

1.2 parts of the above cyclohexene derivative, melting point 36–37° C., are boiled with 60 parts of 0.1 N sodium ethylate solution in ethanol for 12 hours under reflux. After cooling, some ice and the quantity of glacial acetic acid required for neutralization are added, the solvent is evaporated in a vacuum and the reaction product taken up in ether. The ether solution, after washing and drying over sodium sulphate, is evaporated, and the cyclization product is distilled in a vacuum. The 1,5,6-trimethyl-4,9,7,8-tetrahydro-indone-(3) thus obtained is a colourless oil, which turns yellow on exposure to air, and which boils at 145° C. (10 mm.). Its semicarbazone melts at 222–223° C. with decomposition.

In place of the 1,2-diacetyl-ethylene any other 1,2-diacyl-ethylene or -acetylene may be used, for example, $\Delta^1$-1,2-diacetyl-propene, 1,2-diisobutyryl-ethylene or a 1,2-diacetyl-acetylene.

If, in place of a simple butadiene, a $\Delta^{1,2}$-1-vinyl-polyhydronaphthalene or a $\Delta^{1,2}$-1-ethinyl-polyhydronaphthalene or a derivative of either is used as parent material, a cyclopentano-polyhydrophenanthrene or its derivative is analogously obtained. By starting from the analogous polyhydronaphthalenes substituted in 6-position, the 1,2-diacyl-polyhydrophenanthrenes substituted in 7-position may be obtained and furthermore dehydrated to the cyclopentano-polyhydrophenanthrenes substituted in 3-position.

Example 2

3 parts of 1-vinyl-6-methoxy-3,4-dihydronaphthalene and 1 part of diacetyl-ethylene in 25 parts absolute benzene are heated for 48 hours at 110–115° C. in a bomb tube. The solution is evaporated and ethyl acetate is added to the residue, whereupon the condensation product crystallizes out. It may be purified by recrystallization from an ethyl acetate-petroleum ether mixture and then melts at 174–175° C.

In addition to this product, a second, isomeric condensation product is formed in smaller quantities by the addition of diacetyl-ethylene to 1-vinyl-6-methoxy-3,4- dihydronaphthalene, which remains in the mother-liquors of the product melting, when purified, at 174–175° C. It may be isolated in the following manner: The mother-liquors are evaporated and the residue is dissolved in petroleum ether-benzene (1:1). This solution is now filtered through a column of activated aluminium, the column being washed with a further quantity of the same solvent mixture. The combined filtrates are evaporated, and the unconverted diacetyl-ethylene removed from the residue by heating in a high vacuum to 80° C. It is hereupon again subjected to chromatographic purification by means of aluminium oxide, when, by extraction with a mixture of equal parts of petroleum ether and benzene, a crystalline fraction, melting point about 105° C., is obtained. The isomeric condensation product is finally obtained in a pure state by sublimation in a high vacuum at 110–120° C. It melts at 107–108° C.

By hydrogenation, using a palladium-calcium carbonate catalyst, both condensation products yield the same dihydro product. Hydrogenation is preferably carried out in ethyl acetate and proceeds very rapidly. The dihydro product may be recrystallized from ethyl acetate-petroleum ether and melts at 127–128° C.

The constitution of the products obtained is illustrated in the formulae below. The condensation product melting at 174–175° C. is probably represented by Formula I (1,2-diacetyl-7-methoxy - 1,2,3,4,9,10 - hexahydrophenanthrene) and the product melting at 107–108° C. by Formula II (1,2-diacetyl-7-methoxy-1,2,3,9,10,11-hexahydrophenanthrene). Formula III represents the dihydro product, which would thus be designated 1,2-diacetyl-7-methoxy- 1,2,3,4,9,10,11,12-octahydrophenanthrene.

(1,2 - diacetyl-7-methoxy - 1,2,3,4,9,10 - hexahydrophenanthrene: $C_{19}H_{22}O_3$), is dissolved in 5 parts of benzene, 25 parts of a 0.1 N sodium methylate solution in methanol are added and the whole is boiled for 24 hours on the water bath under reflux. After cooling, it is neutralized with acetic acid, and, after dilution with water, the reaction product is extracted with ether. The ethereal solution is washed, dried and evaporated. The residue is dissolved in a mixture of equal parts of benzene and petroleum ether and is purified by filtering through a column of activated aluminium oxide. The column is washed with the same solvent and the combined filtrates are evaporated. The cyclization product obtained in this manner is further purified by recrystallization from chloroform-petroleum ether and then melts at 116–117° C.

Analysis of the cyclization product gives the empirical molecular formula $C_{19}H_{18}O_2$. Thus, in addition to the elimination of water, dehydrogenation with loss of two hydrogen atoms has taken place. The dehydrogenation has been caused by the atmospheric oxygen, which was not excluded in the cyclization experiment described in this example.

The cyclization product $C_{19}H_{18}O_2$ is represented by one of the two following formulae:

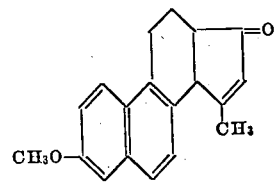

or

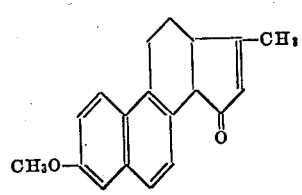

(I) 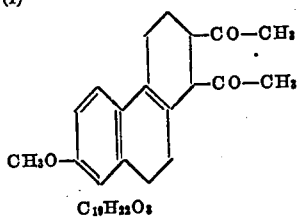 $C_{19}H_{22}O_3$ (II) 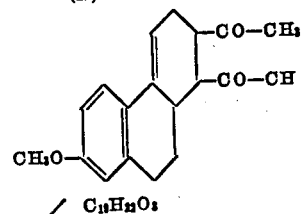 $C_{19}H_{20}O_3$

+H₂     +H₂

(III) 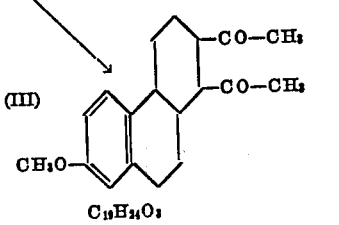 $C_{19}H_{24}O_3$

If instead of the reduction in part all the double bonds in the condensation products are hydrogenated or if one uses instead of the 3,4-dihydronaphthalene derivative an analogous 3,4, 5,6, 7,8, 9,10-octahydronaphthalene derivative as starting material perhydro-phenanthrene derivatives are obtained.

Example 3

0.7 part of the condensation product melting at 174–175° C. and described in Example 2,

Example 4

0.7 part of the hydrogenated condensation product $C_{19}H_{24}O_3$ of melting point 127–128° C., described in Example 2, is heated in 40 parts of a 0.2 N solution of sodium ethylate in absolute alcohol for 50 hours on the water-bath. After cooling the solution is neutralized with acetic acid, diluted with water and the alcohol is evaporated in a vacuum. The reaction product is taken up in ether, the ethereal solution washed, dried and evaporated. The residue is dissolved in a mixture of equal parts of benzene and petroleum ether and the solution is filtered through a column of activated aluminium oxide. After washing with a further quantity of the same solvent mixture, the united filtrates are evaporated. A cyclization product, $C_{19}H_{22}O_2$, melting at 181–183° C., is obtained by recrystallizing the thus purified reaction product from an ethyl acetate-petroleum ether mixture. The oxime, prepared in the usual manner, melts at 185–186° C.

The cyclization product is represented by one of the following two formulae:

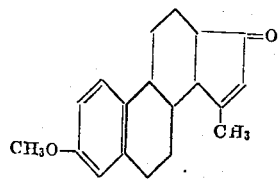

or

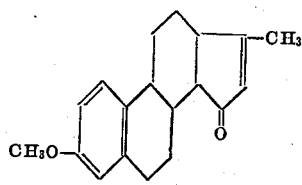

What I claim is:

1. Process for the manufacture of cyclic condensation products, comprising condensing compounds which contain a system of conjugated multiple carbon linkages with a member of the group consisting of 1:2-diacyl-ethylenes and 1:2-diacyl-acetylene.

2. Process for the manufacture of cyclic condensation products, comprising condensing compounds which contain a system of conjugated multiple carbon linkages with a member of the group consisting of 1:2-diacyl-ethylenes and 1:2-diacyl-acetylene, containing in at least one of the two acyl radicals in α-position a member of the group consisting of a methylene and a methyl group.

3. Process for the manufacture of cyclic condensation products, comprising condensing compounds which contain a system of conjugated multiple carbon linkages with a member of the group consisting of 1:2-diacyl-ethylenes and 1:2-diacyl-acetylene, containing in at least one of the two acyl radicals in α-position a member of the group consisting of a methylene and a methyl group, and then treating the products obtained with dehydrating agents.

4. Process for the manufacture of cyclic condensation products, comprising condensing compounds which contain a system of conjugated multiple carbon linkages with a member of the group consisting of 1:2-diacyl-ethylenes and 1:2-diacyl-acetylene, containing in at least one of the two acyl radicals in α-position a member of the group consisting of a methylene and a methyl group, and then treating the products obtained with dehydrating agents after reduction of double linkages present.

5. Process for the manufacture of cyclic condensation products, comprising condensing compounds which contain a system of conjugated multiple carbon linkages with a member of the group consisting of 1:2-diacyl-ethylenes and 1:2-diacyl-acetylene, containing in at least one of the two acyl radicals in α-position a member of the group consisting of a methylene and a methyl group, and then treating the products obtained with dehydrating agents after reduction in part of double linkages present.

6. Process for the manufacture of cyclic condensation products, comprising condensing $\Delta^{1,2}$-1-vinyl-polyhydro-naphthalenes substituted in 6-position with 1,2-diacetyl-ethylenes, and then treating the products obtained with dehydrating agents, after reduction in part of double linkages present.

7. The cyclic condensation products obtained by condensation of compounds which contain a system of conjugated multiple carbon linkages with compounds being a member of the group consisting of 1:2-diacyl-ethylenes and 1:2-diacyl-acetylene.

8. The cyclic condensation products obtained by condensation of compounds which contain a system of conjugated multiple carbon linkages with compounds being a member of the group consisting of 1:2-diacyl-ethylenes and 1:2-diacyl-acetylene containing in at least one of the two acyl radicals in α-position a member of the group consisting of a methylene and a methyl group, followed by dehydration.

9. The cyclic condensation products obtained by condensation of compounds which contain a system of conjugated multiple carbon linkages with compounds being a member of the group consisting of 1:2-diacyl-ethylenes and 1:2-diacyl-acetylene containing in at least one of the two acyl radicals in α-position a member of the group consisting of a methylene and a methyl group, followed by dehydration, after reduction of double linkages present.

10. The 1:2-diacyl-7-alkoxy-polyhydro-phenanthrenes.

11. The products obtained by dehydration of a 1:2-diacyl-7-alkoxy-polyhydro-phenanthrene, and containing in at least one of the two acyl radicals in α-position a member of the group consisting of a methylene and a methyl group.

MOSES WOLF GOLDBERG.